(12) United States Patent
Horsting

(10) Patent No.: US 7,161,113 B2
(45) Date of Patent: Jan. 9, 2007

(54) LASER MACHINING SYSTEM FOR FORMING MULTIPLE MACHINING SPOTS BY A SINGLE LASER

(75) Inventor: John James Horsting, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 82 days.

(21) Appl. No.: 10/840,242

(22) Filed: May 7, 2004

(65) Prior Publication Data

US 2004/0206734 A1 Oct. 21, 2004

Related U.S. Application Data

(63) Continuation of application No. 10/383,505, filed on Mar. 10, 2003, now Pat. No. 6,740,847.

(51) Int. Cl.
  *B23K 26/06* (2006.01)
(52) U.S. Cl. .................. 219/121.73; 219/121.74; 219/121.75
(58) Field of Classification Search .......... 219/121.73, 219/121.74, 121.75, 121.79, 121.78
  See application file for complete search history.

(56) References Cited

U.S. PATENT DOCUMENTS

| | | | | |
|---|---|---|---|---|
| 3,588,218 A | * | 6/1971 | Hunt et al. ............... 359/212 |
| 3,953,706 A | | 4/1976 | Harris et al. ............. 219/121 L |
| 4,059,876 A | | 11/1977 | Ditto .................... 29/156.7 A |
| 4,160,894 A | | 7/1979 | Stemmler et al. ......... 219/121 L |
| 4,370,540 A | * | 1/1983 | Davis et al. ............ 219/121.85 |
| 4,636,611 A | * | 1/1987 | Penney .................. 219/124.34 |
| 4,694,139 A | | 9/1987 | Röder ....................... 219/121 |
| 4,818,834 A | | 4/1989 | Rupert ..................... 219/69.17 |
| 4,911,711 A | | 3/1990 | Telfair et al. .................. 606/5 |
| 5,043,553 A | * | 8/1991 | Corfe et al. ............... 219/121.7 |
| 5,093,548 A | | 3/1992 | Schmidt-Hebbel ...... 219/121.71 |
| 5,163,934 A | | 11/1992 | Munnerlyn ..................... 606/5 |
| 5,237,148 A | | 8/1993 | Aoki et al. ............... 219/121.7 |
| 5,523,544 A | | 6/1996 | Hertzel et al. ............ 219/121.7 |
| 5,601,733 A | * | 2/1997 | Partlo ....................... 219/121.7 |
| 5,607,606 A | | 3/1997 | Mori et al. .............. 219/121.67 |
| 5,632,083 A | | 5/1997 | Tada et al. .................... 29/827 |
| 5,670,069 A | * | 9/1997 | Nakai et al. ............. 219/121.73 |
| 5,751,588 A | * | 5/1998 | Freedenberg et al. ....... 700/186 |
| 5,805,748 A | * | 9/1998 | Izawa .......................... 385/15 |
| 5,885,199 A | | 3/1999 | Shao ........................... 483/19 |
| 6,172,331 B1 | | 1/2001 | Chen ...................... 219/212.71 |
| 6,229,113 B1 | | 5/2001 | Brown ..................... 219/121.7 |
| 6,264,486 B1 | | 7/2001 | Jiang et al. ................. 439/161 |
| 6,355,907 B1 | * | 3/2002 | Kuehnle et al. ......... 219/121.7 |
| 6,365,871 B1 | | 4/2002 | Knowles et al. ......... 219/121.7 |
| 6,452,132 B1 | * | 9/2002 | Fuse ........................ 219/121.7 |
| 6,541,732 B1 | * | 4/2003 | Hirose et al. ............. 219/121.7 |

(Continued)

FOREIGN PATENT DOCUMENTS

JP  9-225665  9/1997

(Continued)

*Primary Examiner*—M. Alexandra Elve

(57) ABSTRACT

A laser machining system is provided that includes a work-piece and at least one light source that produces a laser light along a first axis. The laser light defines a first portion of laser light and a second portion of laser light radially inward relative to the first portion. An optical element reflects the first portion of laser light at an angle relative to the first axis so that the second portion of laser light passes through the optical element along the first axis. A first optical assembly collimates the first portion of laser light into a first cross-sectional area on the work-piece at a sufficient power density to machine the work-piece.

15 Claims, 3 Drawing Sheets

U.S. PATENT DOCUMENTS 6,600,132 B1    7/2003   Horsting et al. ......... 219/127.7
6,603,095 B1*   8/2003   Hamann .................. 219/121.7
6,635,847 B1*  10/2003   Horsting ............... 219/121.71

FOREIGN PATENT DOCUMENTS

JP            9-236066         9/1997

* cited by examiner

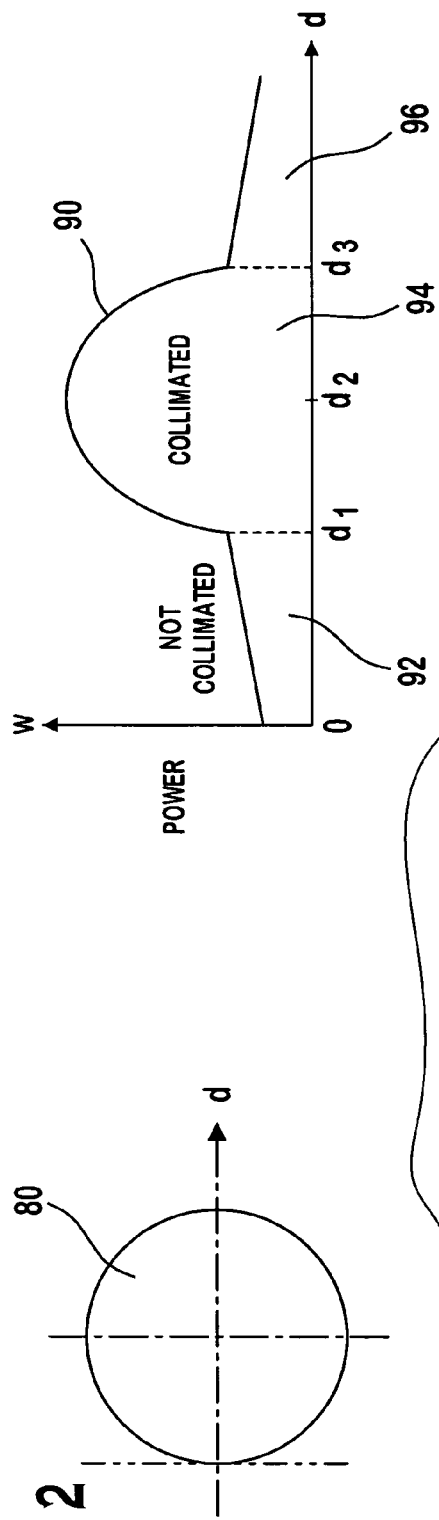
FIG. 2
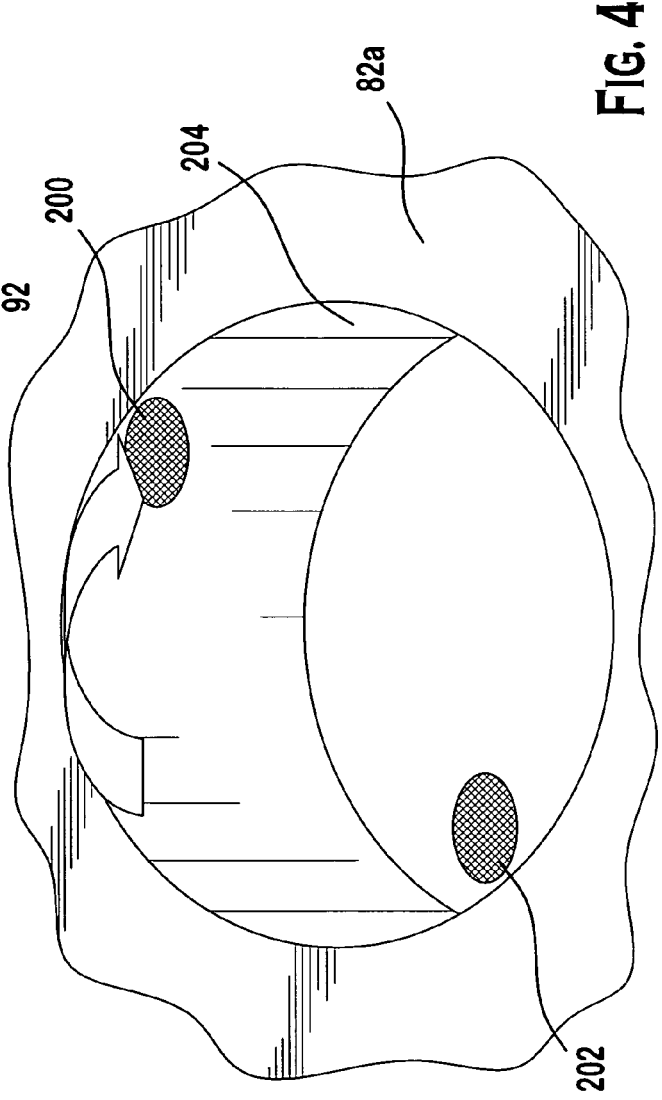
FIG. 3
FIG. 4

LASER MACHINING SYSTEM FOR FORMING MULTIPLE MACHINING SPOTS BY A SINGLE LASER

RELATED APPLICATION

This is a continuation application under 35 U.S.C. § 120 of U.S. patent application Ser. No. 10/383,505, filed on Mar. 10, 2003 now U.S. Pat. No. 6,740,847, entitled "Method of Forming Multiple Machining Spots by a Single Laser," now allowed, which application is incorporated herein by reference in its entirety into this continuation application.

BACKGROUND OF THE INVENTION

Fuel flowing through a fuel injector typically exits at a nozzle end of the fuel injector. The nozzle end is believed to have a disk with at least one orifice to control, in part, the spray pattern and the direction of the fuel exiting the fuel injector.

The orifice used in fuel injectors is believed to be formed by drilling through a workpiece that can be of a suitable cross section. The work piece is believed to be further machined so that the work piece can be assembled with the nozzle end of a fuel injector.

At least two laser-machining techniques are believed to be used for machining orifices. One is percussion drilling, and the other is trepanning or helical drilling. Percussion drilling is believed to be less than desirable due to a variation in beam profile and targeting or the random nature of metal heating and expulsion that most likely result in a non-cylindrical or non-circular orifice. Trepanning, on the other hand, is believed to be more precise as a center hole is believed to be initially formed before the formation of the orifice and is believed to create less debris during machining. Helical drilling is similar to trepanning but without the initial formation of a center hole.

Regardless of the techniques, a single laser is typically used to machine a single work piece at a time in such laser system. In order to maximize the use of the laser system, it would be desirable to increase the ability to form more than one orifice at a time on a single work piece or to form orifices on more than one work piece at a time. It would also be desirable to increase the number of consistent quality orifices produced by a single laser machining system.

SUMMARY OF THE INVENTION

The present invention provides for a laser machining system that includes a work-piece, at least one light source, an optical element and a first optical assembly. The at least one light source produces a laser light along a first axis. The laser light defines a first portion of laser light and a second portion of laser light. The second portion is radially inward relative to the first portion. The optical element reflects the first portion of laser light at an angle relative to the first axis so that the second portion of laser light passes through the optical element along the first axis. The first optical assembly collimates the first portion of laser light into a first light beam of a first cross-sectional area onto the work-piece at a sufficient power density to machine the work-piece.

In an alternative embodiment the present invention provides for a machining system that includes a work-piece, a light source, means for directing first and second portions of the light source, and means for collimating at least one of the first and second portion of the light source. The light source produces substantially collimated light along a first axis. The substantially collimated light defines a first portion of light and a second portion of light. The second portion is radially inward relative to the first portion. The means for directing the first portion of the light at an angle relative to the first axis towards the light source and the second portion of light away from the light source along the first axis. The means for collimating collimate the first portion of light into a first light beam of a first cross-sectional area onto the work-piece at a sufficient power density to machine the work-piece.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

FIG. 2 is a schematic view of a laser beam according to a preferred embodiment.

FIG. 3 is a simplified graph illustrating a distribution of power across the preferred embodiment of a laser beam of FIG. 2.

FIG. 4 is a schematic illustration of the location of the laser machining spots on a sample work piece.

DETAILED DESCRIPTION OF THE PREFERRED EMBODIMENTS

FIGS. 1–4 illustrate preferred embodiments of laser systems that allow multiple laser beams with each beam having a generally constant power density from a single laser machine to be formed.

Figure 1A:
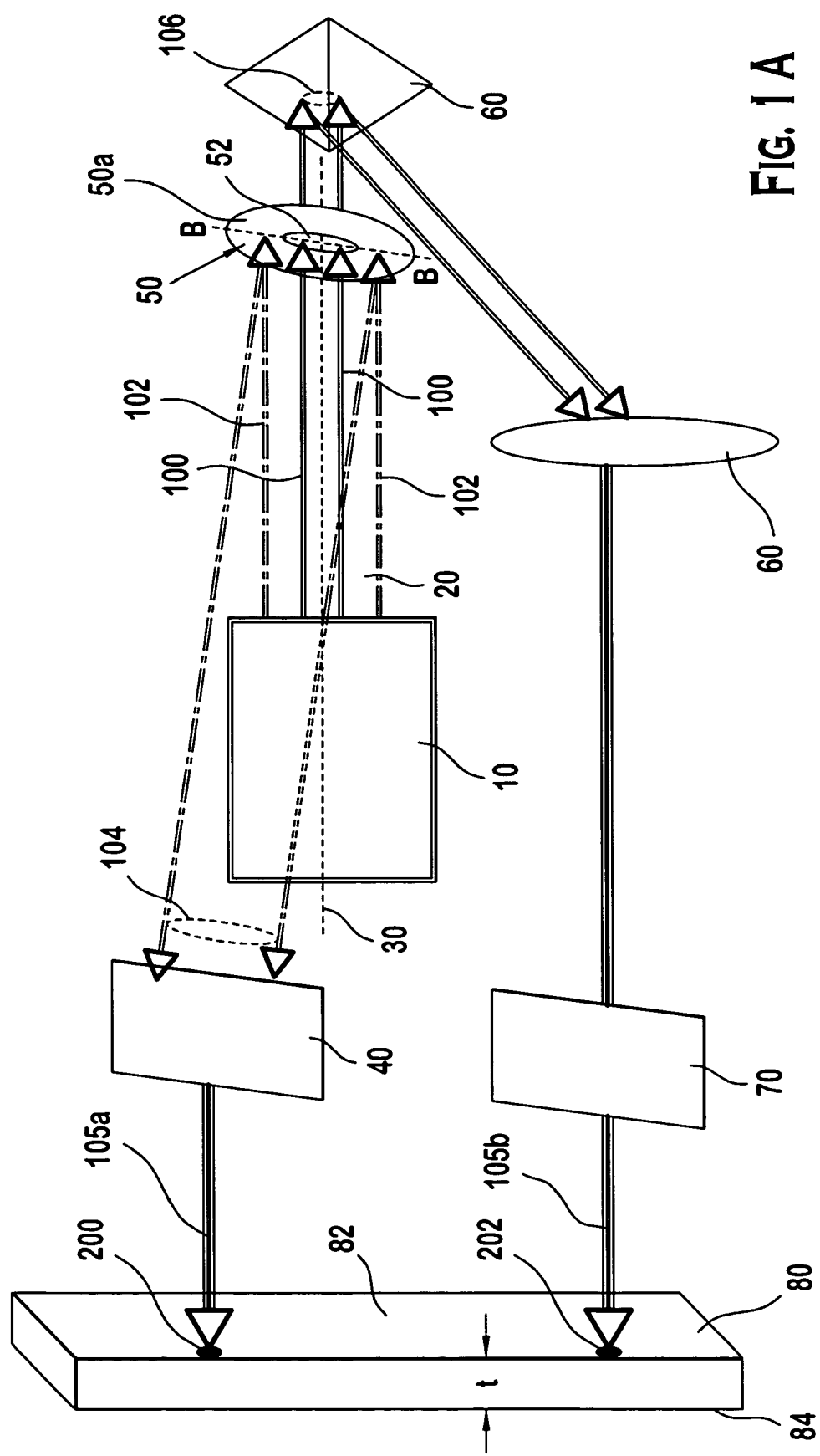
FIG. 1A is a simplified schematic view of the components of a system involved in the formation of constant power density, multiple-beams according to a preferred embodiment.
Figure 1B:
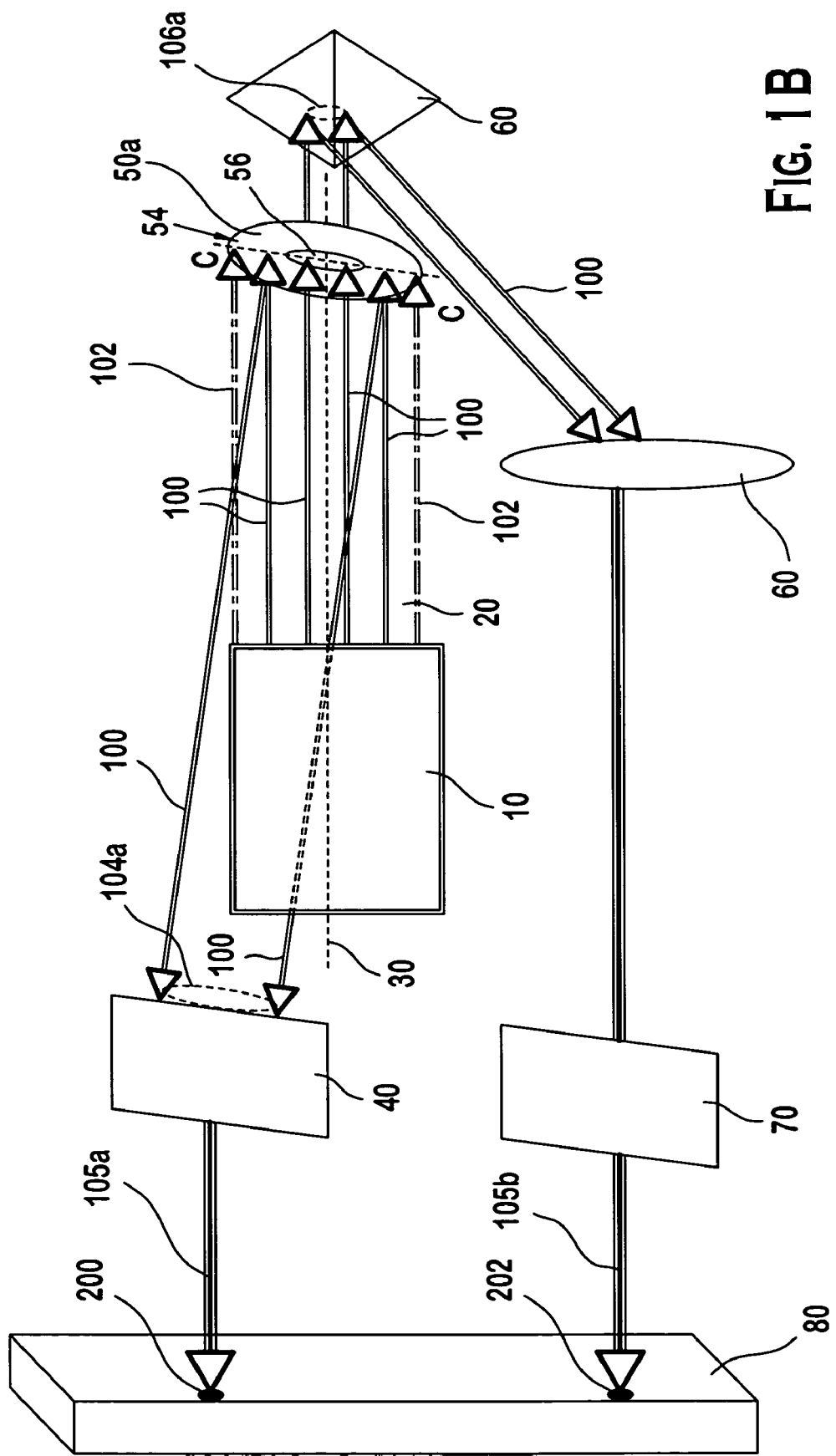
FIG. 1B is a simplified schematic view of components of an alternate system involved in the formation of constant power density, multiple-beams according to another preferred embodiment.

Referring to FIGS. 1A and 1B, a laser 10 provides a laser beam 20 of generally coherent light that can also be nearly monochromatic and generally collimated along a beam axis 30 towards first optical assembly 40, scraper reflector 50 or 52, redirecting optical assembly 60 and second optical assembly 70, and a work piece 80.

The laser 10 can provide laser beam 20 of a different cross-sectional area, such as, for example, square, rectangular, circular or other suitable polygons. In a preferred embodiment, the laser beam 20 is generally circular in cross-sectional area 80, shown here in FIG. 2. Power distribution of the laser beam 20 can be correlated to the diameter of the cross-sectional beam area 80 to provide for a beam profile 90. That is, as shown in FIG. 3, the power of the laser beam 20 increases at a first slope over a first distance $d_1$, from a first position on the outer circumference of the cross-sectional beam area due to a changing mixture of collimated light 100 and non-collimated light 102. The changing mixture of collimated light and non-collimated light includes collimated light that increases relative to non-collimated light to define a first outer region 92 of power density, i.e., power (Watts) over area $(d/2)^2 * \pi$ or "fluence" in Watts/centimeter-squared. At a given distance greater than $d_1$ near a central area of the cross-sectional beam area, power rises in a non-linear fashion due to a much greater concentration of collimated light towards a maximum level at the proximate center of the cross-sectional beam area at $d_2$, which then decreases in a non-linear fashion away from the center to define a center region 94. At a second position $d_3$ generally diametric to the first position, power decreases at a second slope inverse to the first slope due to the increasing level of non-collimated portion of laser light to define a second outer region 96. It is noted that collimated light usually determines a rated power density of a laser 10 due to the nature of non-collimated light, which may be less useful than collimated light.

The laser light source 10 can be any laser with sufficient power density (i.e., quantifiable as Watt per centimeter squared) "to machine" a work piece. As used herein, the term "to machine" or "machining" denotes that application of a laser light of a sufficient power density to remove materials on one or more of the surfaces of the work piece 80 in order to form, for example, surface geometries or to drill through the work piece between the first and second surfaces in order to form, for example, orifices of different cross-sections. Preferably, the laser light source 10 can be Model LM100, LM100X, or LM150 sold by Oxford Laser™ with a rated power density of at least one Megawatt per centimeter-squared (1 Megawatt/cm²). More preferably, the power density of the laser light source 10 should be less than or equal to $1\times10^{12}$ Watts per centimeter-squared (1 Terawatt/cm²) and the laser light source 10 can be a solid state laser, a copper vapor laser, a Neodymium:Vanadate (Nd:VAN) laser, or a frequency doubled Neodymium:Yttrium-Aluminum-Garnet (Nd: YAG) laser having a wavelength between approximately 511 nanometers to approximately 578 nanometers.

It is believed that the outer regions 92 and 96 and the central region 94 of the laser beam 20 can provide at least two power densities with each power density formed by a combination of the outer regions 92 and 96 being approximately equal to the power density of the central region 94. And by virtue of the preferred embodiments disclosed herein, a single laser beam 20 can be used to provide at least two focus or machining spots of nearly the same power density from a single laser. That is, according to the preferred embodiments, a single laser of a rated power density can function as if it were two "separate" lasers, with each "separate" laser having the same rated power density of the single laser to thereby provide nearly twice the rated power density, or to double the machining capability of the single laser.

Referring to FIG. 1A, the laser provides a beam 20 of laser light that may include collimated light 100 and non-collimated light 102 along beam axis 30. A first scraper reflector 50 is placed such that a plane B—B on which the first scraper reflector 50 may lie on is oblique to the beam axis 30 so as to permit a first perimeter 104 of the non-collimated portion 102 of light radially outward of the beam axis 30 to reflect off the reflective surface 50a of the scraper reflector 50. This reflected first perimeter 104 of non-collimated light 102 is directed to first optical assembly 40, shown in schematic form that recollimates the non-collimated light 102 to form a collimated beam of light 105a for a first machining spot 200. A second perimeter 106 of a portion of the collimated light 100 that is radially inward of the non-collimated portion is permitted to pass through a first sufficiently sized opening 52 of the first scraper reflector 50 so that redirecting optical assembly 60 and second optical assembly 70 redirect the collimated portion of light. The redirected collimated light 100 can be expanded so that the second perimeter 106 of light is approximately the same cross-sectional area as the first perimeter 104 portion.

Subsequently, the expanded second perimeter portion 106 can be collimated (depending on whether the second perimeter portion is non-collimated or not) by a telescopic arrangement or an aspherical surface of a reflector (e.g., scraper 50) that can be part of the second optical assembly or formed as a separate arrangement. Alternatively, the second optical assembly can include a beam expander, such as, for example, a diverging lens or second optical assembly with a pinhole. Regardless of the actual optical arrangements, the second optical assembly 70 operate to focus the expanded and collimated second perimeter portion 106 of light 105b to a second machining spot 202 that can be of the same size as the first machining spot 200. It should be noted that the optical assemblies 40, 50, 60, 70 can include a prism, turning mirror, focusing lenses and suitable optics in each of the optical assemblies that allow each of the beams 105a, 105b to be directed generally perpendicular to the workpiece in the preferred embodiments. Preferably, the opening 52 of the first scraper reflector 50 is sized so that substantially the entire collimated portion 100 of light 20 passes through the opening 52.

The work piece 80 can be of any suitable material and dimension or shapes for laser machining, including that of a thin metallic plate. Preferably, the work piece 80 is stainless steel and generally planar in shape with a first surface 82 generally parallel to a second surface 84 at a distance (i.e., a thickness "t") of approximately 50 to 600 microns, and more particularly of about 300 microns. Also preferably, the laser machine 10 is configured to machine generally circular orifices 204 of consistent orifice quality extending through the work piece 80 of approximately 20 microns to 300 microns in diameter, and particularly one or more orifices of about 160 microns in diameter over a duration of one of a fraction of a millisecond, at least one millisecond, or in multiple pulses over a duration of about thirty seconds.

As used herein, the term "orifice qualities" can include parameters such as, for example, taper and ellipticity of the orifice in percentage form, where the taper is a difference between average entry diameter and average exit diameter and divided by thickness of the work piece multiplied by 100 and the ellipticity is a difference between the major diameter and minor diameter multiplied by two and the result divided by the sum of the major diameter and minor diameter multiplied by 100. Preferably, the variation between the taper of the at least one orifice is about ±10% and other orifices and variation between ellipticity of each orifice with other orifices is ±10%.

It should be noted that the light source of FIG. 1A can include a light source that, regardless of whether the light is collimated, non-collimated or a mixture thereof, provides a sufficient power density to machine a workpiece. This light source can be divided by a ratio such that two or more beams can be obtained where each beam has generally the same power density as the other beams of the light source. Moreover, the light source is not limited to a single laser light source 10 but can be, for example, a plurality of light sources. One light source of the plurality of light sources can be a first light source that produces nearly all collimated light 100. Another light source of the plurality of light sources can be a second light source (not shown) that produces a sufficient power density of non-collimated light 102. Alternatively, at least one of the light sources can be a non-laser light source while the other light source(s) of the plurality of light sources can be a laser light source. Where two or more laser light sources are used to produce the respective collimated light 100 and non-collimated light 102, the laser light sources can be individually pulse width modulated to control the power density or irradiance of the respective collimated light 100 and non-collimated light 102. The use of two or more light sources is believed to eliminate additional optics required for a single source. Preferably, a single laser light source 10 is used such that a ratio of irradiance, or power density, between the collimated light 100 and non-collimated light 102 can be between approximately 1:1 to approximately 0.1:1, and a surface area of the non-collimated light 102 can be approximately 1 to approximately 4 times or more of the surface area of the collimated light 100 as viewed on a virtual plane orthogonal to the laser beam axis 30.

Referring to FIG. 1B, the laser provides a beam 20 of laser light along beam axis 30. In the preferred embodiment, the laser can be a solid-state laser that provides nearly all collimated light output. Although non-collimated light 102 output can be produced in the preferred embodiment of FIG. 1B, it is preferable to utilize the collimated light 100 portion to form the multiple focus or machining spots rather than a mixture of collimated light 100 and non-collimated light 102 as in the exemplary preferred embodiment of FIG. 1A. And although a scraper reflector is also used in FIG. 1B, the second scraper reflector 54 has a different surface area with an aspherical reflective surface and the reflector 54 is oriented on a plane C—C, which can be oriented at an angle different than that of plane B—B in order to obtain a suitable reflective geometry. Preferably, the surface area of the second scraper reflector 54 is less than the surface area of the first scraper reflector 50 and the reflective surface is aspherically curved in a suitable manner so as to match the angular dispersion of each non-collimated light ray along a radius out from the centerline of the beam.

The second scraper reflector 54 is located on a plane C—C, which is oblique to the beam axis 30 so as to permit a first perimeter 104a of the collimated light 100 radially outward of the beam axis 30 to reflect from the reflective surface 50a of the second scraper reflector 54. This reflected collimated light 100 is directed to first optical assembly 40, shown in schematic form here, that allows a collimated beam of light to form a first machining spot 200. A second perimeter 106a of the collimated light 100 that is radially inward of the first portion 104a is permitted to pass through a second sufficiently sized opening 56 of the second scraper reflector 54 so that the second perimeter 106a of collimated light 100 is redirected by redirecting optical assembly 60 and second optical assembly 70. The redirected collimated light 100 can be expanded so that the second perimeter 106a of light is approximately the same cross-sectional area as the first portion.

Subsequently, the expanded second portion can be recollimated by a telescopic arrangement that can be part of the second optical assembly or formed as a separate arrangement. Alternatively, the second optical assembly can include a beam expander, such as, for example, a diverging lens or focusing optics with a pinhole. Regardless of the actual optical arrangements, the redirecting optical assembly 60 and second optical assembly 70 operates to focus the expanded and collimated second perimeter 106a of light to a second machining spot 202 that can be of the same size as the first machining spot 200. Each spot is spaced away from the other spot and the work piece 80 can rotate about an axis so that an orifice can be machined by the stationary machining spots. Alternatively, the work piece 80 can remain stationary while the machining spots can rotate about an axis so as to form an orifice. In yet another alternative, the first machining spot 200 can machine a first work piece 80 and the second machining spot 202 can machine a second work piece 80.

Referring to FIG. 4, a pictorial representation of two machining spots, 200 and 202 on a sample work piece is illustrated. Although each of the machining spots is shown pictorially as a homogeneous spot, it should be noted in the preferred embodiments that each of the machining spots has two generally concentric areas of respective power densities where the power density of the inner area is less than the outer area. That is, each of the machining spots 200, 202 has an inner area and an outer area of laser light of respective different magnitudes of power density, which are to be contrasted with the generally single area of power density of the laser beam 20 (FIG. 2) of the preferred embodiments. Preferably, the inner area of each of the machining spot is about 70% of the area of the laser beam 20 prior to optical manipulations in order to achieve multiple focusing spots as described herein.

Each focusing or machining spot is spaced away from the other machining spot, and the work piece 80 can rotate about an axis so that an orifice can be machined by the stationary machining spots. Alternatively, the work piece 80 can remain stationary while the machining spots can rotate about an axis generally parallel to the beam axis 30 so as to form an orifice 204. In yet another alternative, the first machining spot 200 can machine a first work piece 80 and the second machining spot 202 can machine a second work piece (not shown). In yet another, the first machining spot 200 can machine a first surface 82 while a second machining spot 202 can machine a second surface 84 or vice versa. And in yet another alternative, one of the first and second machining spots 200, 202 can form a through orifice 204 while the other of the first and second machining spots 200, 202 can form a chamfer (not shown) to provide for an increase in discharge orifice coefficient. As described herein, the term "chamfer" refers to a surface geometry of an orifice that can include an opening of the orifice or at any point between the first surface 82 and the second surface 84 of the at least one orifice 204. The surface geometry can be, for example, a square edge, a taper or a cone.

In the preferred embodiments, the first machining spot 200 can be directed to the work piece 80 at a first time interval and the second machining spot 202 can be directed to a different or same work piece 80 at a second time interval that can overlap each other. Alternatively, the machining spot corresponding to one of the first and second time intervals can be initiated while the light corresponding to the other time interval is not initiated until a time interval has passed such that the first and second time intervals end at the same instant in time. Preferably, the first and second time intervals are initiated substantially simultaneously and can terminate at the same time or at different intervals.

The preferred embodiments described herein can be used to form orifices for use in fuel injectors. Other applications can include, for example, ink-jet and laser printers, microcircuits including microcircuit boards, micro-machined devices, or any other devices which require a plurality of orifices of consistent dimensionalities and an uniform orifice coefficient for each of the orifices. The dimensionalities can be, for example, the diameter of the orifice, the diameters of the chamfer that can be used to describe the cross-sectional curve of the chamfer in three-dimension, the taper, or ellipticity of each orifice.

While the present invention has been disclosed with reference to certain embodiments, numerous modifications, alterations and changes to the described embodiments are

What I claim is:

1. A laser machining system comprising:
    a work-piece;
    at least one light source that produces a laser light along a first axis, the laser light defining a first portion of laser light and a second portion of laser light, the first portion includes collimated light, the second portion includes noncollimated light, the second portion being radially inward relative to the first portion;
    an optical element that reflects the first portion of laser light at an angle relative to the first axis so that the second portion of laser light passes through the optical element along the first axis;
    a first optical assembly that collimates the first portion of laser light into a first light beam of a first cross-sectional area onto the work-piece at a sufficient power density to machine the work-piece; and
    a second optical assembly that collimates the second portion of laser light into a second light beam having a second cross-sectional area onto the work-piece at a sufficient power density to machine the work-piece, the second optical assembly including a redirecting assembly and a telescopic arrangement to redirect and collimate the second portion of the laser light into the second light beam toward the work-piece so that the second light beam is spaced apart relative to the first light beam.

2. The laser machining system of claim 1, wherein the second optical assembly includes a beam expander to expand the second portion of laser light into the second cross-sectional area substantially equal to the first cross-sectional area.

3. The laser machining system of claim 2, wherein the beam expander comprises a diverging lens.

4. A laser machining system comprising:
    a work-piece;
    at least one light source that produces a laser light along a first axis, the laser light defining a first portion of laser light and a second portion of laser light, the first portion includes collimated light, the second portion includes noncollimated light, the second portion being radially inward relative to the first portion;
    an optical element that reflects the first portion of laser light at an angle relative to the first axis so that the second portion of laser light passes through the optical element along the first axis;
    a first optical assembly that collimates the first portion of laser light into a first light beam of a first cross-sectional area onto the work-piece at a sufficient power density to machine the work-piece;
    a second optical assembly that collimates the second portion of laser light into a second light beam having a second cross-sectional area onto the work-piece at a sufficient power density to machine the work-piece; and
    a telescopic arrangement separate from the first and second optical assemblies to collimate the second portion of the laser light.

5. The laser machining system of claim 1, wherein at least one of the first and second optical assemblies includes a prism, a turning mirror and at least one focusing lens.

6. The laser machining system of claim 1, wherein the power densities of the first and second collimated beams is at least 1 Megawatt per centimeter squared.

7. The laser machining system of claim 1, wherein the first light beam is disposed for rotation about the first axis and the second light beam is disposed for rotation about a second axis spaced from and parallel to the first axis.

8. A laser machining system comprising:
    a work-piece including a first orifice having a first taper and a first ellipticity and at least a second orifice having a second taper and a second ellipticity in the work piece, the first taper and the second taper having a variability therebetween of about plus-or-minus 10% and the first ellipticity and the second ellipticity having a variability therebetween of about plus-or-minus 10 %;
    at least one light source that produces a laser light along a first axis, the laser light defining a first portion of laser light and a second portion of laser light, the second portion being radially inward relative to the first portion;
    an optical element that reflects the first portion of laser light at an angle relative to the first axis so that the second portion of laser light passes through the optical element along the first axis; and
    a first optical assembly that collimates the first portion of laser light into a first light beam of a first cross-sectional area onto the work-piece at a sufficient power density to machine the work-piece.

9. A machining system comprising:
    a work-piece;
    a light source that produces substantially collimated light along a first axis, the light defining a first portion of light and a second portion of light, the second portion being radially inward relative to the first portion;
    means for directing the first portion of the light at an angle relative to the first axis towards the light source and the second portion of light away from the light source along the first axis; and
    means for collimating the first portion of light into a first light beam having a first cross-sectional area onto the work-piece at a sufficient first power density to machine the work-piece,
    wherein the means for directing comprise an optical element having an opening and a reflector surface intersecting and oblique to the first axis such that the first portion of light is reflected at an angle relative to the first axis and the second portion of light passes through the opening.

10. The machining system of claim 9, wherein the first portion of laser light comprises non-collimated light and wherein at least a portion of the second portion of laser light comprises collimated light such that the ratio of irradiance between the collimated light and the non-collimated light ranging from about 1:1 to about 0.1:1.

11. The machining system of claim 8, wherein the light source comprises at least one of a gas or solid-state laser and the plurality of light sources comprises at least one of a copper vapor laser and a frequency doubled Neodymium: Yttrium-Aluminum-Garnet (Nd:YAG) laser.

12. The machining system of claim 9, wherein the optical element comprises a scraper reflector and the opening comprises a generally circular diameter between from 20 microns to approximately 650 microns.

13. The machining system of claim 12, wherein the means for collimating comprises a redirecting assembly, a telescopic arrangement and a beam expander to redirect and collimate the second portion of the laser light into a second light beam of a second cross-sectional area at a sufficient second power density to machine the workpiece, and wherein each of the first and second power densities comprises at least 1 Megawatt per centimeter squared.

14. The machining system of claim 9, wherein the means for collimating comprise a prism, a turning mirror and at least one focusing lens.

15. The machining system of claim 13, wherein the first light beam is disposed for rotation about the first axis and the second light beam is disposed for rotation about a second axis spaced from and parallel to the first axis.

\* \* \* \* \*